United States Patent [19]

Newman

[11] Patent Number: 5,653,222

[45] Date of Patent: Aug. 5, 1997

[54] FLAT PLATE SOLAR COLLECTOR

[76] Inventor: Michael D. Newman, 4120 Shirley Ave., Jacksonville, Fla. 32210

[21] Appl. No.: 591,759

[22] Filed: Jan. 25, 1996

[51] Int. Cl.[6] ........................ F24J 2/24
[52] U.S. Cl. ............ 126/653; 126/655; 126/661; 126/708; 126/908
[58] Field of Search ............... 126/648–657, 126/704–709, 712, 907, 908

[56] References Cited

U.S. PATENT DOCUMENTS

| | | | |
|---|---|---|---|
| 3,866,285 | 2/1975 | Clark | 126/704 |
| 4,011,855 | 3/1977 | Eshelman | 126/660 |
| 4,038,965 | 8/1977 | Lyon | 126/654 |
| 4,204,521 | 5/1980 | Mattson | 126/658 |
| 4,273,098 | 6/1981 | Silverstein | 126/708 |
| 4,281,642 | 8/1981 | Steinberg | 126/704 |
| 4,284,072 | 8/1981 | McKaveney | 126/907 |
| 4,289,113 | 9/1981 | Whittemore | 126/704 |
| 4,311,132 | 1/1982 | van Kuijk | 126/655 |
| 4,372,291 | 2/1983 | Schwartz | 126/908 |
| 4,423,718 | 1/1984 | Garrison | 126/908 |
| 4,586,489 | 5/1986 | Voll et al. | 126/655 |

*Primary Examiner*—James C. Yeung
*Attorney, Agent, or Firm*—Thomas C. Saitta

[57] ABSTRACT

A flat plate solar collector comprising a planar glazing and a rear housing formed into a number of semi-circular cells to receive fin-tube absorbers with minimal direct contact, the glazing being a low iron glass with an anti-reflective exterior coating and a low emissivity interior coating, the glazing being directly supported by the rear housing cells, the interior wall of the rear housing and the lower side of the fin-tube absorber having low emissivity surfaces. At least one radiation shield member having low emissivity upper and lower surfaces is positioned between the fin-tube absorber and the rear housing. The collector is evacuated by atmosphere control means also capable of reintroducing atmosphere into the collector to control internal temperature.

26 Claims, 2 Drawing Sheets

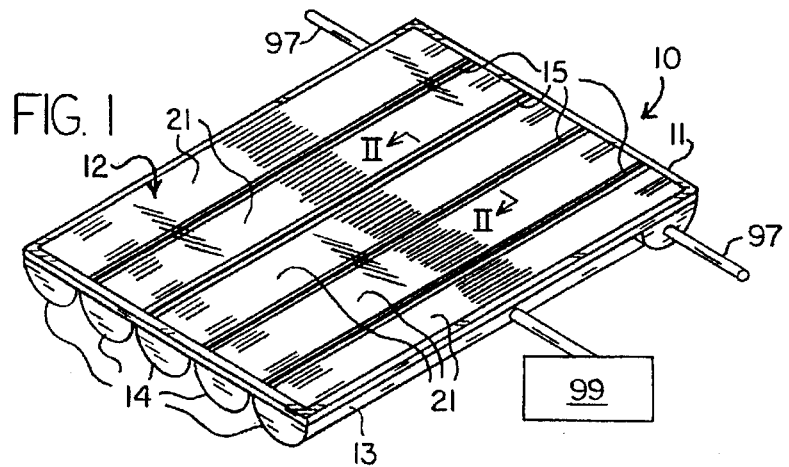
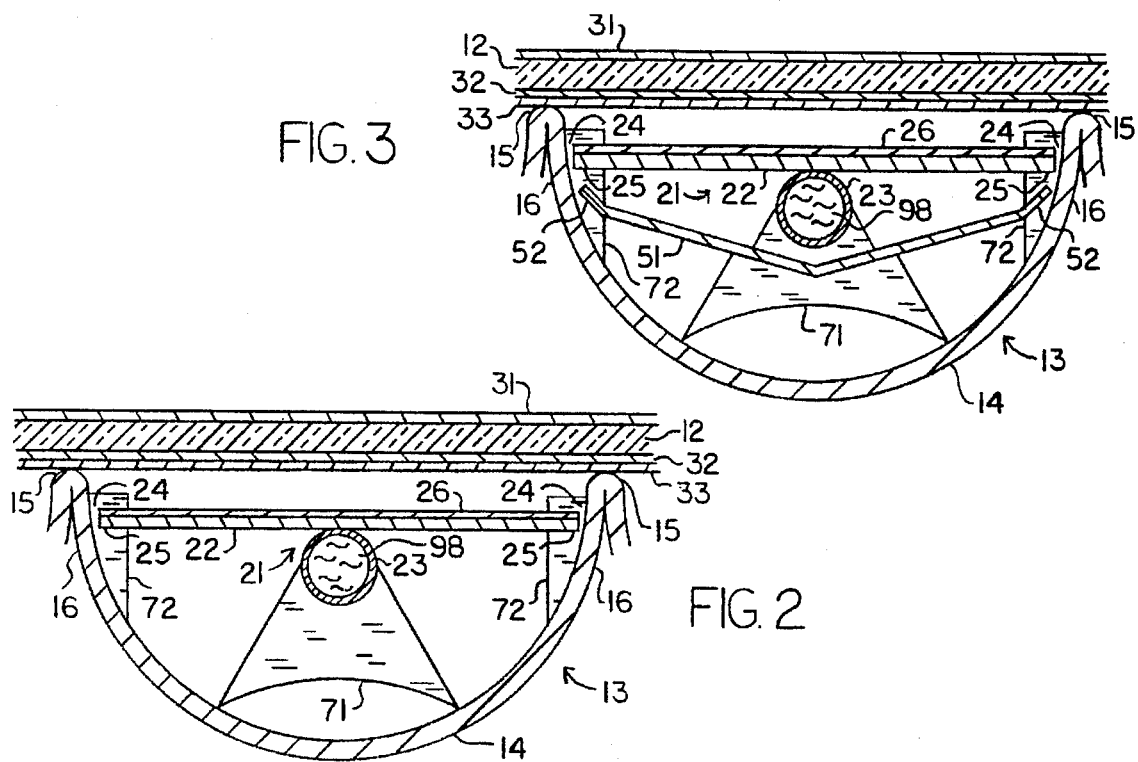

FLAT PLATE SOLAR COLLECTOR

BACKGROUND OF THE INVENTION

The invention relates generally to the field of flat plate solar collector devices used to absorb and transfer solar energy into a collection fluid. More particularly, the invention relates to such devices which are evacuated to increase efficiency and which incorporate a combination of coatings and internal components to enhance reception of incoming solar energy and to reduce outbound radiation losses from the device.

The invention was developed to provide high operating temperatures at high efficiencies from solar energy while avoiding reflecting, tracking, focusing, or vacuum tube type collectors which have traditionally been used for such purposes. Further, the invention was developed to provide an easily manufacturable evacuated flat plate solar energy collector. Previous attempts at delivering an evacuated flat plate collector have provided structures sufficient to resist the forces applied by the atmosphere to an evacuated envelope, but were very difficult and costly to manufacture. More importantly, the previous designs do not effectively deal with thermal radiation losses. The present invention uses a true flat plate absorber, flat gluing and is non-focusing. Focusing severely limits the capture of available solar resources and does not work unless the sunlight is clear, direct and bright. The present invention operates well in diffuse sunlight as well as direct sunlight.

It is well known that the conventional flat plate design is most reliable in its standard operating range and derives the highest operating efficiencies of all the various types of solar collectors. It also does not require direct bright sunlight to operate. Drawbacks associated with traditional flat plate design are that efficiency is a decreasing second order function dominated by convection heat transfer losses, conventional materials of construction cannot survive operational temperatures above 175 degrees C., little attention has been given to thermal radiation heat transfer, and efficient operation occurs only within a relatively small temperature differential above ambient, typically about a 25 to 40 degrees C. range. These limitations are due to the heat losses from the absorber plate due to convection, conduction and thermal infrared emissions, commonly called radiation. Attempts at increasing the operating range of flat plate collectors have resulted in marginal increases in temperature, but trade off efficiency and drive up material and manufacturing costs. Evacuated tubes have been shown to maintain relatively higher temperatures, but fall short of the temperature and efficiency goals needed to produce 6 to 7 bar steam which is required by industry. Focusing, also known as concentrating or reflecting, designs have been more successful from both a cost and efficiency standpoint, but require unoccluded direct sunlight.

It is an object of this invention to produce a flat plate collector comprising a sealed casing comprised of the combination of a flat primary glazing and a rear housing, the rear housing configured to comprise a number of linear cells semi-circular in cross-section, each cell containing a fin-tube collector with collection fluid to absorb the collected heat energy and transport it to an external use, where the amount of inbound solar radiation is optimized and the amount of outbound radiation losses from the device are reduced, thereby providing for a flat plate solar collector capable of high operating temperatures and high efficiency. It is a further object to produce such a device which is capable of delivering up to 30 bar steam with a 50% conversion of sunlight into 232 degree C. fin-tube temperature. It is a further object to provide such a device which incorporates a combination of anti-reflective coatings, low emissivity coatings and internal radiation shields to maximize efficiency. It is a further object to provide such a device where the internal temperature of the device is regulated by selectively evacuating and reintroducing gas into the interior of the casing. It is a further object to provide such a device with a secondary glazing either external or interior to the primary glazing.

SUMMARY OF THE INVENTION

The invention is a flat plate solar collector comprising in general a primary glazing joined to a rear housing to form a sealed casing capable of being evacuated by atmosphere control means. Conduits transport collection fluid into and from the casing, the collection fluid being directed through fin-tube collectors within the casing. The rear housing is configured to provide a series of parallel cells, preferably semi-circular in cross-section, each such cell adapted to support the primary glazing and to receive a fin-tube absorber. The fin-tubes are supported within the cells by base and lateral support members which are designed to minimize contact with the fin-tube and rear housing, and are composed of low heat conductive material. The fin-tubes occupy at least 90 percent of the open area between the side walls of the cells, such that the majority of radiation is absorbed and little passes between the fin-tube absorbers and the side walls. The primary glazing is preferably a tempered, low iron glass material coated externally and internally with an anti-reflective coating transparent to sunlight to increase light transmission through the glazing and coated internally with a low emissivity coating transparent to visible light but reflective to infrared radiation to block escape of thermal radiation. The fin-tube absorbers are provided with optically selective upper surfaces with high absorptivity and low emissivity and are provided with low emissivity lower surfaces. Positioned between the fin-tubes and the rear housing are at least one and preferably plural radiation shields having low emissivity surfaces on both sides. The interior surface of the rear housing is constructed or treated to provide a low emissivity surface to infrared radiation. The atmosphere control means is regulated to evacuate the casing to increase operating temperatures and to reintroduce atmosphere or gas into the casing to reduce operating temperatures.

In alternative embodiments, the invention also comprises a secondary glazing formed form a glass or polymer film which is mounted either external to the primary glazing or within the casing itself between the primary glazing and the fin-tube collectors. The secondary glazing is also preferably coated with a low emissivity coating. The external secondary glazing is adapted to entrap a layer of air or gas between itself and the primary glazing. The internal secondary glazing is mounted so as to allow atmosphere to be evacuated from the space between itself and the primary glazing.

BRIEF DESCRIPTION OF THE DRAWINGS

FIG. 1 is a perspective view of the invention.

FIG. 2 is a cross-sectional view of the basic embodiment of the invention as taken along line II—II of FIG. 1.

FIG. 3 is a cross-sectional view of the invention taken along line II—II of FIG. 1.

DETAILED DESCRIPTION OF THE INVENTION

Figure 4:
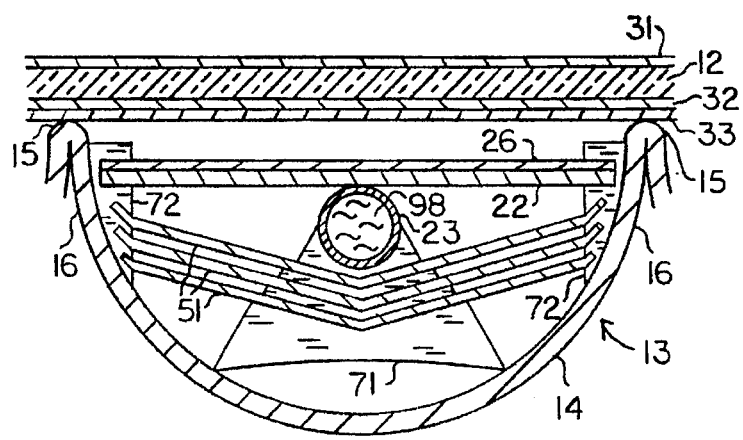
FIG. 4 is a cross-sectional view of an improved embodiment of the invention.

With reference now to the drawings, the invention will be described in detail with regard to the best mode and preferred embodiment. In general, the invention is a flat plate solar collector comprised of a number of segments or cells each containing a fin-tube solar absorber with connections to conduits to allow flow of collection fluid into and from the tube component of the fin-tube solar collector. The fin-tube absorbers are mounted within a sealed casing comprised of a flat upper glazing member and rear housing, the rear housing being formed in a number of channels, preferably semi-circular in cross-section, which define the individual segments to each receive individual fin-tube absorbers. The upper portions of he channels extend above the fin-tube absorbers such that the glazing is directly supported thereon. Vacuum means capable of reducing the internal pressure of the sealed casing are connected to the casing, the vacuum means being adapted to regulate the internal temperature of the casing by selectively reintroducing and removing atmosphere. Preferably, mounted beneath the fin-tube collector and supported above the rear housing is at least one radiation shield member. A low emissivity coating is applied to the interior side of the glazing and an anti-reflective coating is applied to both sides of the glazing.

Referring specifically to FIGS. 1 and 2, the basic embodiment of the invention is shown. The flat plate collector 10 comprises a casing 11 comprised of an upper glazing member 12 and a lower or rear housing member 13. The casing 11 is formed as a sealed system, utilizing gaskets or other known sealing compositions capable of withstanding high temperatures, such as EPDM, silicone or butyl rubber, to seal all joints, fittings and conduit passages. The casing 11 is evacuated to create an internal vacuum by methodologies and apparati known in the art and shown generally as atmosphere control means 99. Heat transfer or collection fluid 98, comprised of any suitable solution known in the art, is passed through the flat plate collector 10 by conduits 97, and may be routed in a serpentine pattern, a parallel pattern, or any other suitable pattern. The glazing member 12 is preferably composed of a high strength, high solar energy transfer medium such as tempered low iron glass. The glazing 12 must be of sufficient strength to resist failure in the unsupported regions when the casing 11 is evacuated. A tempered low iron glass glazing 12 approximately 6 mm in thickness having total solar energy transfer above 90% is preferred. The rear housing 13 is formed into a number of parallel segments or cells 14 with raised sides, such that the juncture between each adjacent cell 14 creates a series of parallel load bearing support ridges 15 to directly support the glazing member 12. For a glazing 12 with a thickness of 6 mm, the span between each support ridge 15 is preferably no more than 127 mm. The rear housing 13 is preferably constructed from a metal or other material of suitable strength properties, preferably with a surface adapted to provide low emissivity, such as polished sheet aluminum. The individual cells 14 are preferably semi-circular in cross-section, as shown in FIG. 2. The circular cross-section provides the best resistance to the deformation forces of the internal vacuum. The interior surface of the rear housing 13 is chosen or treated to provide a hemispheric emittance at 100 degrees C. of 0.05 or less.

Positioned within each cell 14 of rear housing 13 is a fin-tube absorber 21 comprised of a generally planar fin 22 mounted onto a generally linear tube 23, with the tube 23 attached beneath or in the middle of fin 22. The fin 22 provides a large surface area to absorb and transfer solar energy to the tube 23. Collection fluid 98 passing through the tube 23 absorbs the heat energy and transports the energy from the casing 11. The fin-tube absorber 21 is preferably constructed of copper, with fin 22 having a thickness of approximately 0.008 inches and the tube 23 having an outer diameter of 0.5 inches and a wall thickness of at least 0.02 inches. The fin 22 is sized such that the outer ends 25 are positioned adjacent the side walls 16 of the rear housing cell 14 without contacting them directly, creating a minimal gap 24 such that almost all sunlight entering the glazing 12 will strike the upper surface of the fins 22 and because of gap 24 no conductive losses will occur between the fin 22 and the side walls 16. The fin 22 preferably covers at least 90 percent of the open area between the side walls 16. The flat plate solar collector 10 does not utilize sunlight reflected or focused from below the fin 22 to heat the tube 23. The upper surface of the fin 22 which intercepts sunlight is preferably coated with a high absorption, low emissivity coating 26, such as a black nickel over brite nickel coating having an absorption value or alpha of greater than 0.85 and an emittance value or epsilon at 300 degrees C. of less than 0.2. The underside and any other surfaces of the fin-tube 21 which do not intercept sunlight are prepared or treated such that the hemispheric emittance at 300 degrees C. is less than 0.2 and preferably less than 0.05. In this manner the upper surface of the fin-tube collector 21 is a high absorption and low emissivity surface (as opposed to a typical black body fin-tube which is high absorption and high emissivity). The rear surfaces of the fin-tube 21 are low absorption and low emissivity, which in combination with the low absorption, low emissivity polished surface of the rear housing 13 reduces back-side thermal radiation losses from the fin-tube absorber 21.

The fin-tube absorber 21 is supported by base support members 71 and lateral support members 72. It is essential that the fins 22 not contact the rear housing 13 to eliminate conduction losses, and the contact between the support members 71 and 72 with the rear housing 13 must be minimized for the same reason. Base support members 71 and lateral support members 72 are therefore preferably constructed of low heat conductive material such as a ceramic. Additionally, the supports 71 and 72 are designed such that all contact areas are kept to a minimum, comprising either a point or line of contact as opposed to an area of contact. The number of supports 71 and 72 are kept to the minimum necessary to maintain the integrity of the unit.

To reduce thermal losses through the glazing member 12, the upper or exterior side of the glazing 12 is coated with an anti-reflective coating 31 to reduce reflectance loss. A preferred anti-reflective coating 31 is a silica-based sol-gel. The lower or interior surface of the glazing 12 is coated with low emissivity coating 32 which is chosen to increase reflectance by no more than 10% of the total sunlight transmitted by the glazing 12, while at the same time reducing hemispheric emittance at 100 degrees C. to 0.1 or less. A suitable low emissivity coating is a sputter applied indium-tin oxide or the like. The low emissivity undersurface of the glazing 12 now faces the low emissivity upper surface of the fins 22, decreasing radiation transfer from the fins 22 by a factor of ten. An anti-reflective coating 33 is then applied to the interior side of the low emissivity coating to reduce the reflection of transmitted sunlight at its surface by approximately 20%. The combination of the exterior anti-reflective coating 31, interior low emissivity coating 32 and interior anti-reflective coating 33 optimizes transmission of sunlight through the glazing 12 to approximately 85% and radically reduces thermal infrared losses. The outer surface of the glazing will have a total reflectance loss of 2 points, a transmission loss due to absorption of about 1 point, and an epsilon of 0.94. The interior surface will have an epsilon of 0.1. By optimizing the relationship between transmitted sunlight and thermal infrared losses, the overall size of the device can be reduced relative to non-optimized devices while still providing the required energy production.

In a preferred embodiment, the flat plate collector 10 is further provided with at least one (as shown in FIG. 3), and preferably multiple (as shown in FIG. 4), radiation shield members 51 comprised of materials having low emissivity surfaces. The radiation shields 51 are positioned between the fin-tube absorber 21 and the rear housing 13, and are preferably constructed of relatively thin, treated or polished aluminum sheets. Both the upper and lower sides of the radiation shields 51 are treated to create a highly infrared reflective, low emissivity surface (hemispheric emittance at 300 degrees C. of less than 0.2 and preferably less than 0.05) which faces either the low emittance interior surface of the rear housing 13 or the low emittance backside surface of the fin-tube absorber 21. The radiation shields 51 are preferably creased to increase rigidity and are supported by the base support members 71 and lateral support members 72. The radiation shields are configured to extend co-extensive with the fin 22 of the fin-tube absorber 21 to provide a barrier to radiation loss from the backside of the fin-tube absorber 21. In a device containing a single radiation shield 51, as shown in FIG. 3, or for the uppermost radiation shield 51 in a device containing multiple shields 51, as shown in FIG. 4, the radiation shield 51 is preferably configured with raised flaps 52 on each lateral edge. The flaps 52 intercept any heat radiation emitted generally horizontally from the tube 23 of the fin-tube collector 21. The provision of radiation shields 51 reduces radiation loss through the rear housing 13 by providing intermediate temperature gradient radiation barriers. For example, in a flat plate collector 10 with a single radiation shield 51, as shown in FIG. 3, the radiation losses are reduced by 50%, since the radiation shield 51 will adapt to a temperature approximately midway between the ambient temperature equalled by the rear housing 13 and the elevated temperature of the fin-tube collector 21. For an ambient temperature of 298 degrees K and a fin-tube 21 temperature of 573 degrees K, the radiation shield will achieve a steady-state temperature of approximately 438 degrees K. Since radiation transfer is a 4th power relationship with absolute temperature, the new gradient will reduce radiation transfer by a factor of 2. By providing multiple radiation shields 51, as shown in FIG. 4, the backside radiation losses are reduced in an equivalent manner. Each additional radiation shield 51 halves the temperature differential between its facing components. Provision of three radiation shields 51 reduces the losses by a factor of 4.

For maximum efficiency, the atmosphere within the casing 11 of the flat plate collector 10 is evacuated by atmosphere control means 99 to reduce convection losses. Atmosphere control means 99 may comprise any known type pumping mechanism with the capability of removing air from the casing 11 as well as reintroducing air back into the casing 11. Because of the increased efficiency and reduction of thermal losses, it may be necessary to regulate the internal temperature of the casing 11 to prevent the device from overheating to the point of causing failure of the fin-tubes 21 or conduits 97. This may be accomplished by many known methods, such as through the use of adjustable shutters, internal absorbants, etc. The preferred method is to utilize atmosphere control means 99, which operates in response to the measured or calculated internal temperature of the device. When the internal temperature of the casing 11 exceeds a predetermined maximum temperature, either because of low temperature requirements for the outflowing collection fluid 98 or because the unit is in a nonuse or stagnant mode, atmosphere or any inert gas is reintroduced into the casing by atmosphere control means 99 to lower the internal temperature by increasing convection losses through the rear housing 13 and glazing 12. When the internal temperature has dropped into the acceptable range, reintroduction of atmosphere or gas is stopped. If the internal temperature drops below a predetermined minimum temperature, the gas or atmosphere is evacuated to eliminate convection losses and elevate the internal temperature back into the acceptable range.

Figure 5:
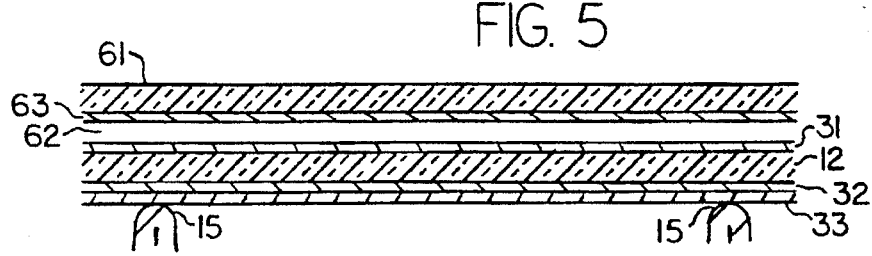
FIG. 5 is a cross-sectional partial view of an alternative embodiment of the invention.

To improve the efficiency of the flat plate collector 10 even more, additional components can be incorporated into the apparatus. As shown in FIG. 5, a secondary external glazing member 61 may be positioned external to and separated from the primary glazing 12. This secondary glazing 61 may comprise thin tempered glass or a polymer film, such as a high strength fluoropolymer film. The secondary glazing 61 is mounted onto the casing 11 in a sealed manner to entrap an insulating layer 62 of air or an inert gas such as argon. The combination of secondary glazing 61 and insulating gas layer 62 reduces the convection losses to atmosphere from the upper surface of the primary glazing 12, which increases the actual temperature of the primary glazing 12 above ambient temperature. This results in a higher temperature on the underside of the glazing 12 which faces the fin-tube collector 21, thereby reducing radiation losses from the upper surface of the fin 22. To further increase the temperature of the primary glazing 12 by reducing radiation loss through the upper side of the glazing 12, a low emissivity coating 63, such as indium-tin oxide or the like, can be applied to the interior side of the secondary glazing 61.

Figure 6:
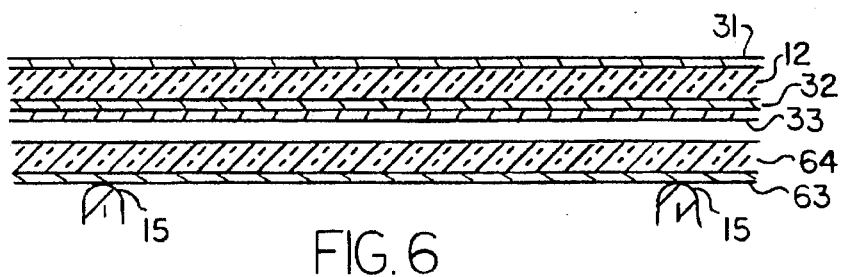
FIG. 6 is a cross-sectional partial view of still another alternative embodiment of the invention.

In still another improved alternative embodiment, shown in FIG. 6, the secondary glazing is an internal secondary glazing 64 mounted between the primary glazing 12 and the fin-tube 21. As above, the secondary internal glazing 64 may comprise a thin tempered glass or a polymer film. The secondary internal glazing 64 is separated a distance from the underside of the primary glazing 12 and is mounted to allow for evacuation of the atmosphere from the space between. Likewise as above, a low emissivity coating 63 can be applied to the underside of the secondary internal glazing 64. This configuration produces a 50% reduction in radiation losses from the front of the device.

It is understood that equivalents and substitutions to components and elements of the above described invention may be obvious to those skilled in the art, and the above illustrations are not meant to be limiting. The true scope and definition of the invention therefore is to be as set forth in the following claims.

I claim:

1. A flat plate solar collector apparatus comprising a generally planar glazing member transparent to sunlight combined with a rear housing comprising individual cells with raised side walls forming support ridges which support said glazing, where said glazing member and said rear housing form a sealed casing able to sustain a vacuum, each said cell adapted to contain a fin-tube solar absorber having outer ends positioned adjacent but not contacting said side walls, and individual radiation shield members having low emissivity upper and lower surfaces, at least one of each said radiation shield members being positioned between each said fin-tube absorber and said rear housing, where each said radiation shield member does not contact said side walls and is separated from adjacent said radiation shield members.

2. The apparatus of claim 1, where said cells are semi-circular in cross-section.

3. The apparatus of claim 1, further comprising atmosphere control means connected to said casing, said atmosphere control means adapted to create said vacuum within said casing.

4. The apparatus of claim 1, where said rear housing has an interior surface with low thermal emissivity.

5. The apparatus of claim 1, where said fin-tube absorber has an underside with low thermal emissivity.

6. The apparatus of claim 1, where said glazing is composed of low iron glass.

7. The apparatus of claim 1, where the exterior surface of said glazing is provided with an anti-reflective coating.

8. The apparatus of claim 1, where the interior surface of said glazing is provided with an anti-reflective coating.

9. The apparatus of claim 1, where the interior surface of said glazing is provided with a low emissivity coating.

10. The apparatus of claim 1, further comprising multiple radiation shield members positioned between each said fin-tube absorber and said rear housing, said multiple radiation shield members having low emissivity upper and lower surfaces.

11. The apparatus of claim 1, further comprising a secondary external glazing member transparent to sunlight positioned on the exterior side of said glazing member, the interior side of said secondary external glazing member having a low emissivity coating.

12. The apparatus of claim 1, further comprising a secondary internal glazing member transparent to sunlight positioned between said glazing member and said fin-tube absorbers, the underside of said secondary internal glazing member having a low emissivity coating.

13. The apparatus of claim 1, further comprising base support members which support said fin-tube absorbers and which have minimal contact with said rear housing.

14. The apparatus of claim 1, further comprising lateral support members which support said outer ends of said fin-tube absorbers and which have minimal contact with said rear housing.

15. The apparatus of claim 3, where said atmosphere control means is adapted to reintroduce atmosphere into said casing to control internal temperature.

16. The apparatus of claim 1, where said fin-tube absorber occupies at least 90 percent of the area between said side walls.

17. The apparatus of claim 1, where said fin-tube absorber has an upper side with high absorption and low emissivity.

18. The apparatus of claim 1, where each said radiation shield member comprises lateral edges having raised flaps.

19. A flat plate solar collector apparatus comprising a casing comprising a generally planar primary glazing member, a secondary internal glazing member, atmosphere control means to evacuate atmosphere to create a vacuum within said casing, a rear housing and a number of fin-tube solar absorbers, said casing being sealed such that said casing may be evacuated of atmosphere by said atmosphere control means to create a vacuum, said rear housing comprising a number of cells having raised side walls, said side walls directly supporting said glazing member and said cells adapted to receive said fin-tube solar absorbers with minimal direct contact to said cells, said cells having a low emissivity interior wall, each said fin-tube absorber extending across one of said cells to cover at least 90 percent of the open area between said side walls, said fin-tube absorber having a low emissivity lower surface, said primary glazing member being composed of low iron glass having an anti-reflective coating on the exterior surface and a low emissivity coating on the interior surface, and said secondary internal glazing member being positioned within said casing between said primary glazing member and said fin-tube absorbers, the underside of said secondary internal glazing member having a low emissivity coating, said secondary internal glazing member being separated a distance from said primary glazing member, whereby said atmosphere control means evacuates atmosphere between said secondary internal glazing member and said primary glazing member to create a vacuum.

20. The apparatus of claim 19, further comprising a radiation shield member having low emissivity upper and lower surfaces positioned between each said fin-tube absorber and said rear housing.

21. The apparatus of claim 20, further comprising additional radiation shield members having low emissivity upper and lower surfaces positioned between each said fin-tube absorber and said rear housing.

22. The apparatus of claim 21, where said radiation shield members are composed of polished aluminum.

23. The apparatus of claim 19, where said atmosphere control means is responsive to the internal temperature within said casing and adjusts the internal temperature by withdrawing atmosphere from said casing to create a vacuum to raise the internal temperature and by reintroducing atmosphere into said casing to lower the internal temperature.

24. A flat plate solar collector apparatus comprising a generally planar primary glazing member transparent to sunlight combined with a rear housing comprising individual cells with raised side walls forming support ridges which support said primary glazing member, where said primary glazing member and said rear housing form a sealed casing able to sustain a vacuum, each said cell adapted to contain a fin-tube solar absorber having outer ends positioned adjacent but not contacting said side walls, and atmosphere control means connected to said casing, where said atmosphere control means is responsive to the internal temperature within said casing and adjusts the internal temperature by withdrawing atmosphere from said casing to create a vacuum to raise the internal temperature and by reintroducing atmosphere into said casing to lower the internal temperature.

25. The apparatus of claim 24, further comprising radiation shield members having low emissivity upper and lower surfaces, at least one of each said radiation shield members being positioned between each said fin-tube absorber and said rear housing.

26. The apparatus of claim 24, further comprising a secondary internal glazing member positioned within said casing between said primary glazing member and said fin-tube absorbers, the underside of said secondary internal glazing having a low emissivity coating, said secondary internal glazing member being separated a distance from said primary glazing member, whereby said atmosphere control means evacuates atmosphere between said secondary internal glazing member and said primary glazing member to create a vacuum.

* * * * *